(12) United States Patent
Tsai et al.

(10) Patent No.: US 11,927,430 B2
(45) Date of Patent: Mar. 12, 2024

(54) DARTBOARD STRUCTURE AND METHOD FOR MANUFACTURING THE SAME

(71) Applicant: Asmeditron Inc., Hsinchu County (TW)

(72) Inventors: Huai-Fang Tsai, Hsinchu County (TW); Diann-Fang Lin, Hsinchu County (TW)

(73) Assignee: Asmeditron Inc., Hsinchu County (TW)

( * ) Notice: Subject to any disclaimer, the term of this patent is extended or adjusted under 35 U.S.C. 154(b) by 421 days.

(21) Appl. No.: 17/204,890

(22) Filed: Mar. 17, 2021

(65) Prior Publication Data

US 2021/0302132 A1 Sep. 30, 2021

(30) Foreign Application Priority Data

Mar. 26, 2020 (TW) .................................. 109110227

(51) Int. Cl.
*F41J 3/00* (2006.01)
*B29C 45/14* (2006.01)
*F41J 5/052* (2006.01)
*B29L 31/52* (2006.01)

(52) U.S. Cl.
CPC ....... *F41J 3/0095* (2013.01); *B29C 45/14639* (2013.01); *F41J 5/052* (2013.01); *B29L 2031/5281* (2013.01)

(58) Field of Classification Search
CPC ...... F41J 3/02; F41J 3/0095; F41J 5/04; F41J 5/052; F41J 3/0009; F41J 3/0066; F41J 5/041
See application file for complete search history.

(56) References Cited

U.S. PATENT DOCUMENTS

| 4,678,194 A * | 7/1987 | Bowyer | F41J 3/0095 |
| | | | 273/404 |
| 4,982,967 A * | 1/1991 | Kicks | F41J 3/0066 |
| | | | 273/408 |
| 2008/0111311 A1* | 5/2008 | Yiu | F41J 3/02 |
| | | | 273/371 |

FOREIGN PATENT DOCUMENTS

| GB | 2342053 A * | 4/2000 | F41J 5/04 |
| WO | WO-2006119682 A1 * | 11/2006 | F41J 5/04 |

OTHER PUBLICATIONS

English machine translation of WO-2006119682-A1 (Shao) (Year: 2006).*

* cited by examiner

*Primary Examiner* — Laura Davison (74) *Attorney, Agent, or Firm* — Li & Cai Intellectual Property Office (57) ABSTRACT

A dartboard structure and a method for manufacturing the dartboard structure are provided. The dartboard structure includes a dartboard body unit, a dartboard frame unit, a first sensor unit and a second sensor unit. The dartboard body unit has a plurality of score regions. The dartboard frame unit has a plurality of through openings that penetrate through the dartboard frame unit, and each of the through openings corresponds to one of the score regions. The second sensor unit and the first sensor unit are in an intersecting arrangement and have a predetermined gap therebetween. The first sensor unit and the second sensor unit surround a plurality of first sensing regions, and each of the first sensing regions corresponds to one of the score regions and one of the through openings.

5 Claims, 12 Drawing Sheets

DARTBOARD STRUCTURE AND METHOD FOR MANUFACTURING THE SAME

CROSS-REFERENCE TO RELATED PATENT APPLICATION

This application claims the benefit of priority to Taiwan Patent Application No. 109110227, filed on Mar. 26, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a dartboard structure and a manufacturing method of the dartboard structure, and more particularly to a dartboard structure that is easy to manufacture and has accurate sensing, and a method for manufacturing the dartboard structure.

BACKGROUND OF THE DISCLOSURE

In recent years, as consumer habits change and technology advances, there are more and more consumer electronics, such as basketball arcade and electronic dart machines, and also conventional dartboards and darts for users to play with. The darts that are associated with darts games can be categorized into steel-tip and soft-tip darts, and the corresponding dartboards can also be categorized into hard and soft types. When using hard darts, users are usually required to manually keep score and may be more easily injured, such that most of the darts machines installed at various venues use soft darts, while hard darts are rarely used.

Currently, most sensing-type automatic scoring dartboards are made by winding electromagnetic sensor coils around a dartboard frame and externally adding a protective film in order to maximize an effective scoring area for darts on the surface of the dartboard. Since conventional electromagnetic sensor coils are made by winding the electromagnetic sensor coils along the dartboard frame, it is not only tedious to produce the sensor coils, but the problem of insufficient angle or broken coils also easily occurs due to the wires being too soft or too hard. Moreover, the conventional sensing-type automatic scoring dartboard has the electromagnetic sensor coils disposed on the surface of a dartboard body, so that the electromagnetic sensor coils are prone to be broken or damaged by tips of the darts, and the sensing effect is prone to be reduced due to oxidation and deterioration caused by exposure. Conventionally, there are 3 types of sensing manners for automatic scoring dartboards: electro-magnetic sensing, pressure sensing and optical image sensing.

Therefore, how the structural design can be improved to overcome the aforementioned problems has become an important issue to be resolved in the relevant industry.

SUMMARY OF THE DISCLOSURE

In response to the above-referenced technical inadequacies, the present disclosure provides a dartboard structure and a manufacturing method of the dartboard structure.

In one aspect, the present disclosure provides a dartboard structure that includes a dartboard body unit, a dartboard frame unit, a first sensor unit, and a second sensor unit. The dartboard body unit has a plurality of score regions. The dartboard frame unit is disposed on the dartboard body unit, the dartboard frame unit has a solid structure and has a plurality of through openings that penetrate through the dartboard frame unit, and each of the through openings corresponds to one of the score regions. The first sensor unit is disposed in the dartboard frame unit. The second sensor unit is also disposed in the dartboard frame unit, and the second sensor unit and the first sensor unit are in an intersecting arrangement and have a predetermined gap therebetween. The first sensor unit and the second sensor unit surround a plurality of first sensing regions, and each of the first sensing regions corresponds to one of the score regions and one of the through openings.

In another aspect, the present disclosure provides a method for manufacturing a dartboard structure, the method includes the following steps: providing a frame jig; disposing a first sensor unit and a second sensor unit in the frame jig and filling a colloid into the frame jig to form a dartboard frame unit, so that the second sensor unit and the first sensor unit are in an intersecting arrangement and have a predetermined gap therebetween; removing the frame jig; disposing the dartboard frame unit on a dartboard body unit to form the dartboard structure. The dartboard frame unit has a plurality of through openings that penetrate through the dartboard frame unit, the first sensor unit and the second sensor unit surround a plurality of first sensing regions, and each of the first sensing regions corresponds to one of the through openings.

One of the beneficial effects of the present disclosure is that, by virtue of "the dartboard frame unit being disposed on the dartboard body unit, the dartboard frame unit having a solid structure, the dartboard frame unit having a plurality of through openings that penetrate through the dartboard frame unit, and each of the through openings corresponding to one of the score regions", "the first sensor unit being disposed in the dartboard frame unit", "the second sensor unit being disposed in the dartboard frame unit, and the second sensor unit and the first sensor unit being in an intersecting arrangement and having a predetermined gap therebetween", and "the first sensor unit and the second sensor unit surrounding the plurality of first sensing regions, and each of the first sensing regions corresponds to one of the score regions and one of the through openings", the dartboard structure provided by the present disclosure is capable of improving the process efficiency of production and structural stability of the product.

Another beneficial effect of the present disclosure is that, by virtue of "providing a frame jig", "disposing a first sensor unit and a second sensor unit in the frame jig and filling a colloid into the frame jig to form a dartboard frame unit, so that the second sensor unit and the first sensor unit are in an intersecting arrangement and have a predetermined gap therebetween", "removing the frame jig", "disposing the dartboard frame unit on a dartboard body unit to form the dartboard structure" and "the dartboard frame unit having a plurality of through openings that penetrate through the dartboard frame unit, the first sensor unit and the second sensor unit surrounding a plurality of first sensing regions, and each of the first sensing regions corresponding to one of the through openings", the method for manufacturing a dartboard structure is capable of improving the process efficiency during production and structural stability of the product.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[First Embodiment]

Figure 4:
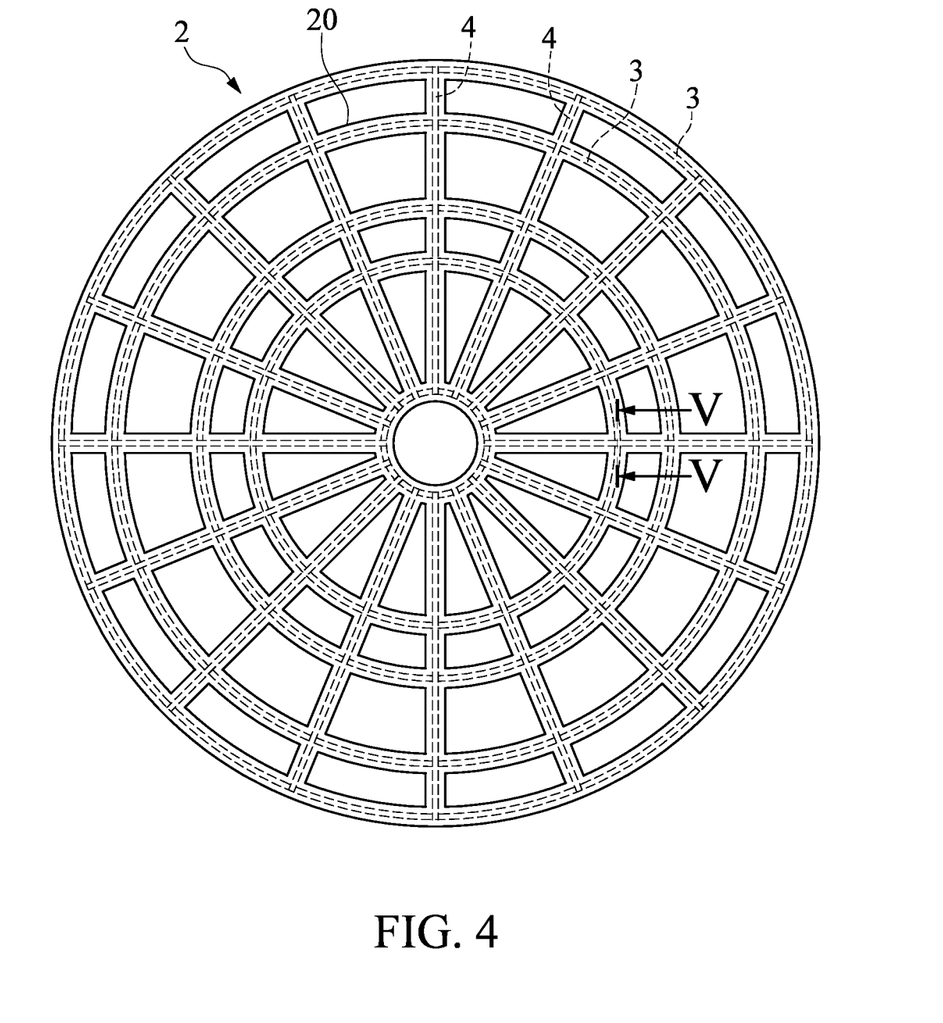
FIG. 4 is a schematic structural view of a dartboard frame unit of the dartboard structure according to the first embodiment of the present disclosure.

References are made to FIGS. 1 to 8, which are respectively a flowchart of a method for manufacturing a dartboard structure, a schematic top view of a frame jig, a schematic view of a structural relationship of the frame jig, a first sensor unit, and a second sensor unit, a schematic structural view of a dartboard frame unit, a cross-sectional view along line V-V of FIG. 4, a schematic perspective view of a dartboard frame unit, a schematic structural view of the first sensor unit and the second sensor unit, and a schematic structural view of the dartboard structure according to a first embodiment of the present disclosure. As shown in the figures, a method for manufacturing a dartboard structure Z is provided in the first embodiment of the present disclosure, and includes the following steps.

Figure 1:
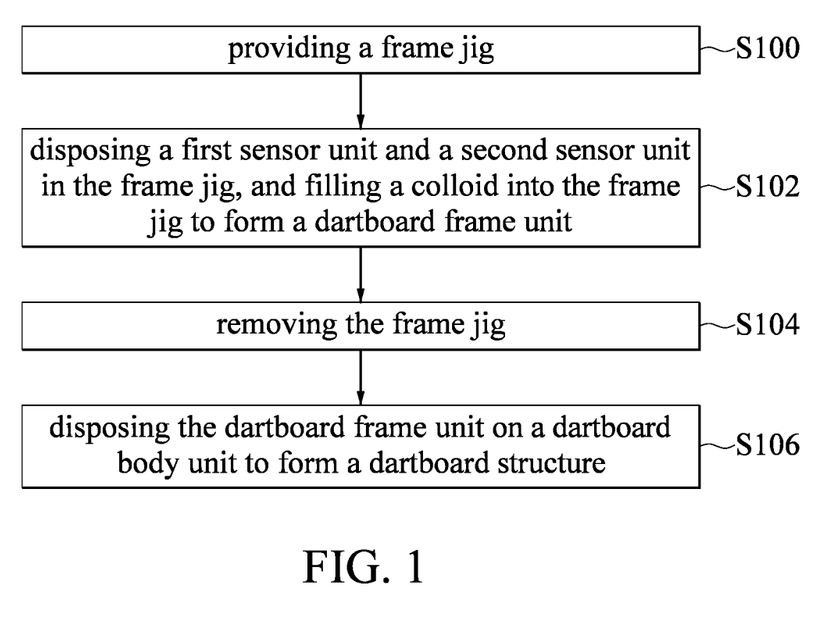
FIG. 1 is a flowchart of a method for manufacturing a dartboard structure according to a first embodiment of the present disclosure.
Figure 2:
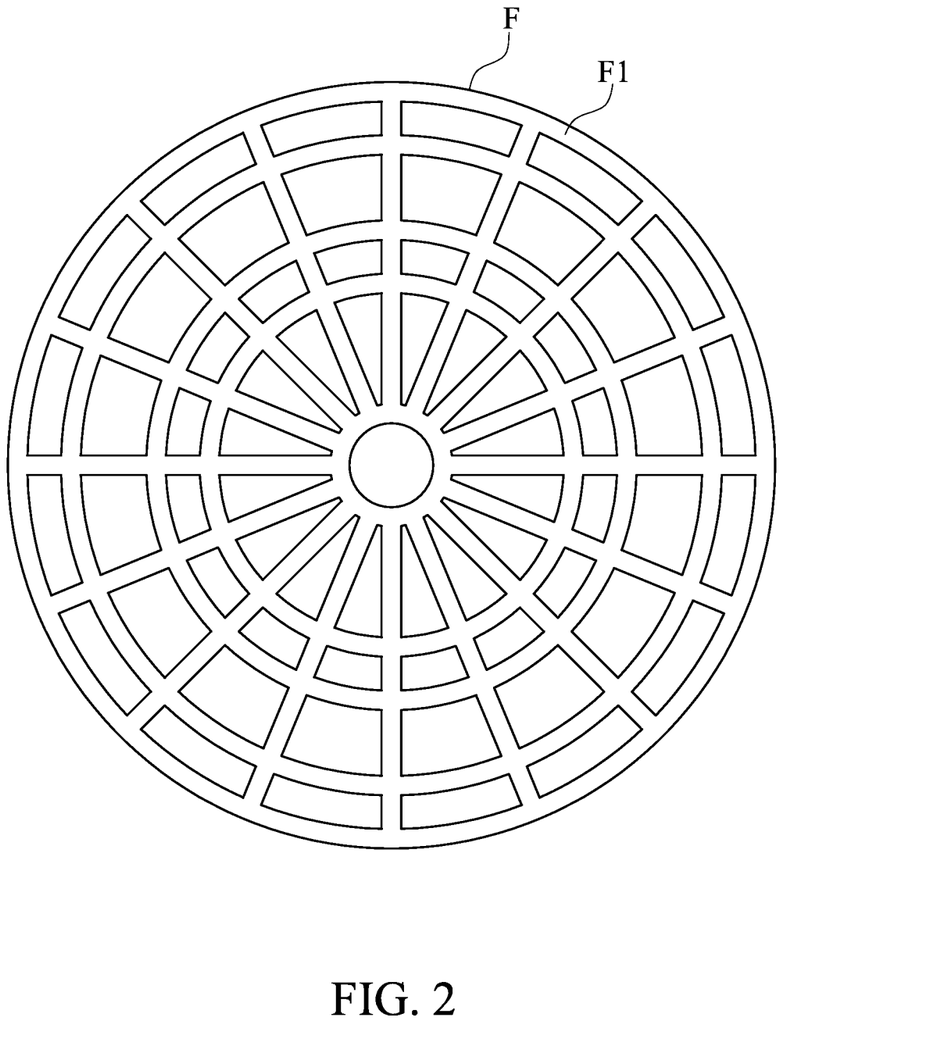
FIG. 2 is a schematic top view of a frame jig of the method for manufacturing the dartboard structure according to the first embodiment of the present disclosure.
Figure 3:
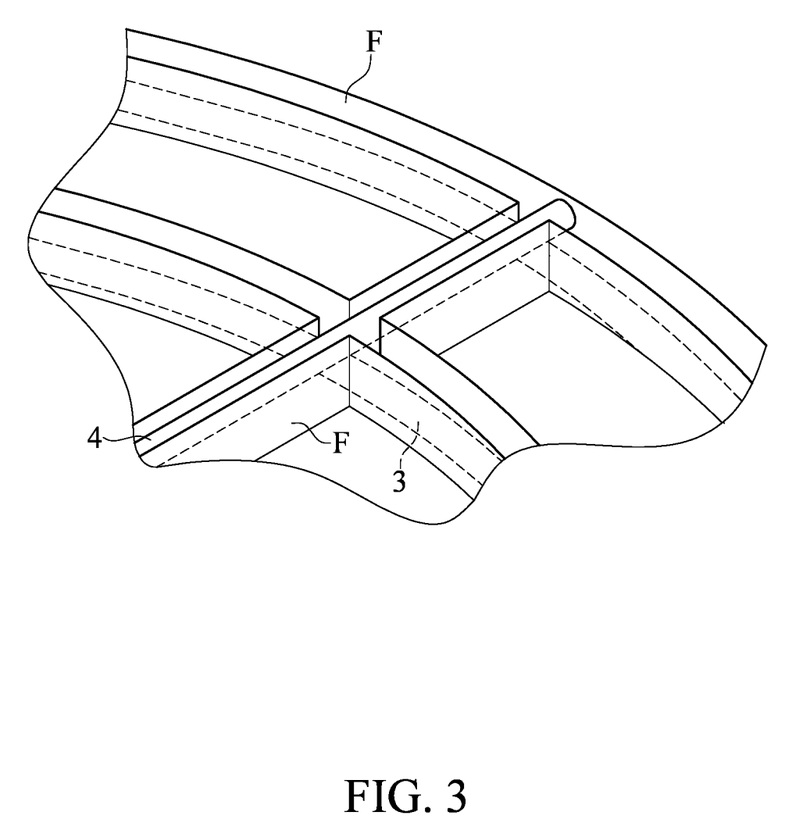
FIG. 3 is a schematic view of a structural relationship of the frame jig, a first sensor unit, and a second sensor unit of the method for manufacturing the dartboard structure according to the first embodiment of the present disclosure.

Firstly, a frame jig F is provided (step S100). For example, as shown in FIG. 1 and FIG. 2, the frame jig F can be a mold for forming a dartboard frame. The frame jig F can have a plurality of holes F1 of different shapes, and the plurality of holes F1 respectively correspond to a plurality of score regions 10 on a dartboard body unit 1, but the present disclosure is not limited thereto.

Next, a first sensor unit 3 and a second sensor unit 4 are disposed in the frame jig F, and a colloid C is filled into the frame jig F to form a dartboard frame unit 2 (step S102). The second sensor unit 4 and the first sensor unit 3 are in an intersecting arrangement and have a predetermined gap H therebetween.

For example, as shown in FIGS. 1 to 5, in the present disclosure, the first sensor unit 3 and the second sensor unit 4 can first be fixed in the frame jig F, and then the colloid C is filled into the frame jig F at one time, and after the colloid C is cured, the dartboard frame unit 2 is formed. The first sensor unit 3 and the second sensor unit 4 are in an intersecting arrangement, and the first sensor unit 3 and the second sensor unit 4 have the predetermined gap H therebetween. The predetermined gap H can be 0.1 to 3 mm, but it is not limited thereto. The colloid C can be an insulating colloid, such as hard plastic, hot-melt adhesive, polyurethane (PU) resin, or other insulating colloid materials, but it is not limited thereto. The first sensor unit 3 and the second sensor unit 4 can be made of electrically conductive wires. Moreover, in the present disclosure, the colloid C can be filled into the frame jig F by using a plastic infusion procedure or an injection procedure. In addition, the present disclosure is not limited to the above-mentioned production procedures. In the present disclosure, the colloid C can also be filled into the frame jig F to form a bottom layer of the dartboard frame. Then, the first sensor unit 3 is disposed into the frame jig F, and the colloid C is filled into the frame jig F to form a middle layer of the dartboard frame. Next, the second sensor unit 4 that has yet to be arranged is disposed into the frame jig F, and the colloid C is filled into the frame jig F again to form an upper layer of the dartboard frame. After the colloid C is cured, the dartboard frame unit 2 is formed. Moreover, the order that the first sensor unit 3 and the second sensor unit 4 of the present disclosure are placed into the frame jig F can instead be placing the second sensor unit 4 first, and then placing the first sensor unit 3, or simultaneously placing the first and second sensor units 3 and 4 into the frame jig F.

Figure 5:
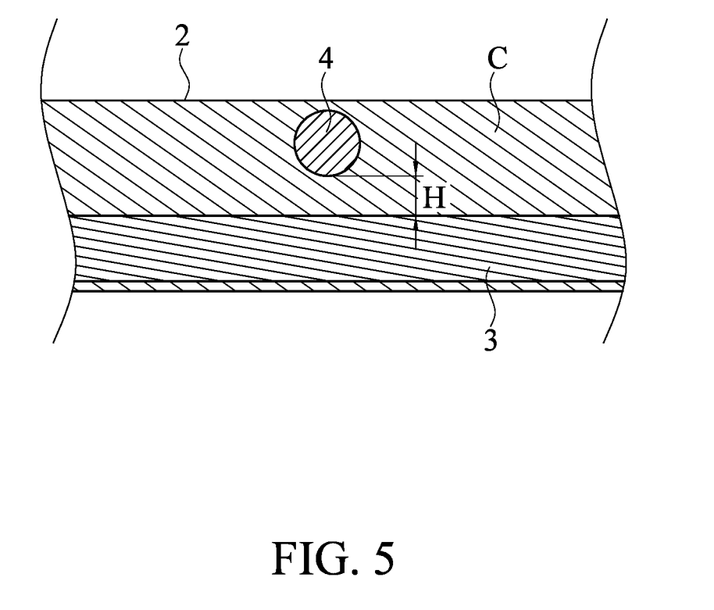
FIG. 5 is a cross-sectional view along line V-V of FIG. 4.
Figure 6:
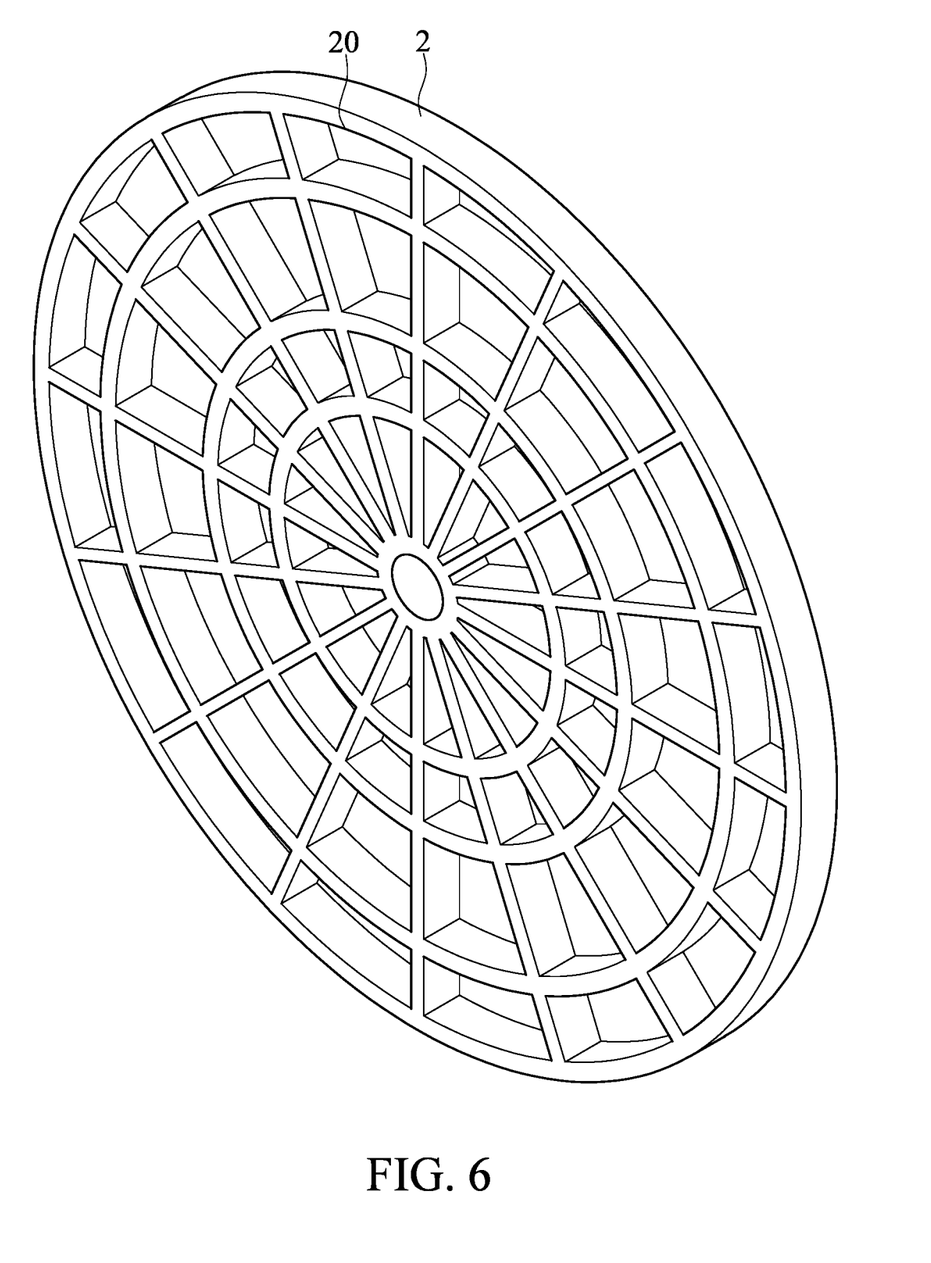
FIG. 6 is a schematic perspective view of the dartboard frame unit of the dartboard structure according to the first embodiment of the present disclosure.
Figure 7:
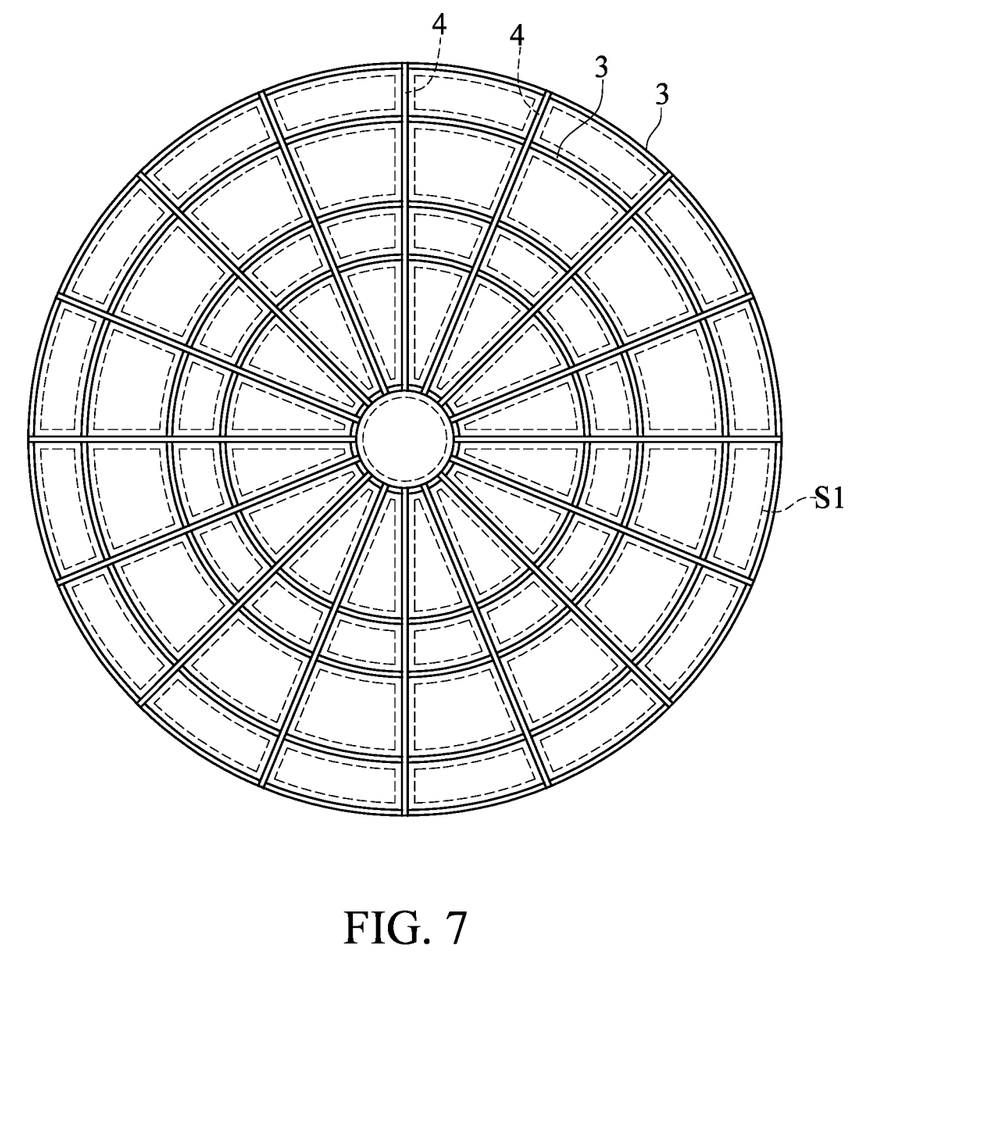
FIG. 7 is a schematic structural view of the first sensor unit and the second sensor unit of the dartboard structure according to the first embodiment of the present disclosure.

It is worth mentioning that, the first sensor unit 3 can be disposed near an upper surface of the dartboard frame unit 2 and the second sensor unit 4 is located near a center or a lower surface of the dartboard frame unit 2. Alternatively, the second sensor unit 4 can be disposed near the upper surface of the dartboard frame unit 2, and the first sensor unit 3 is located near the center or the lower surface of the dartboard frame unit 2 (as shown in FIG. 5). Furthermore, the first sensor unit 3 and the second sensor unit 4 can be disposed near the center of the dartboard frame unit 2, and the first sensor unit 3 and the second sensor unit 4 have the predetermined gap H therebetween.

Next, the frame jig F is removed (step S104). For example, as shown in FIG. 1 and FIGS. 4 to 7, after the colloid C is filled, the frame jig F can be removed to obtain the dartboard frame unit 2. The dartboard frame unit 2 can have a plurality of through openings 20 that penetrate through the dartboard frame unit 2, and each of the through openings 20 corresponds to one of the holes F1 of the frame jig F. Furthermore, the first sensor unit 3 and the second sensor unit 4 surround a plurality of first sensing regions S1, and each of the first sensing regions S1 corresponds to one of the through openings 20.

Finally, the dartboard frame unit 2 is disposed on the dartboard body unit 1 to form the dartboard structure Z (step S106). For example, as shown in FIGS. 1 to 8, after the dartboard frame unit 2 is manufactured, the dartboard frame unit 2 can be pressed on a surface of the dartboard body unit 1, or a groove is formed on the surface of the dartboard body unit 1, and the dartboard frame unit 2 is placed into the groove so that the dartboard frame unit 2 is located in the dartboard body unit 1, but it is not limited thereto. The dartboard body unit 1 is a board structure which serves as a main structure of a dartboard.

Figure 8:
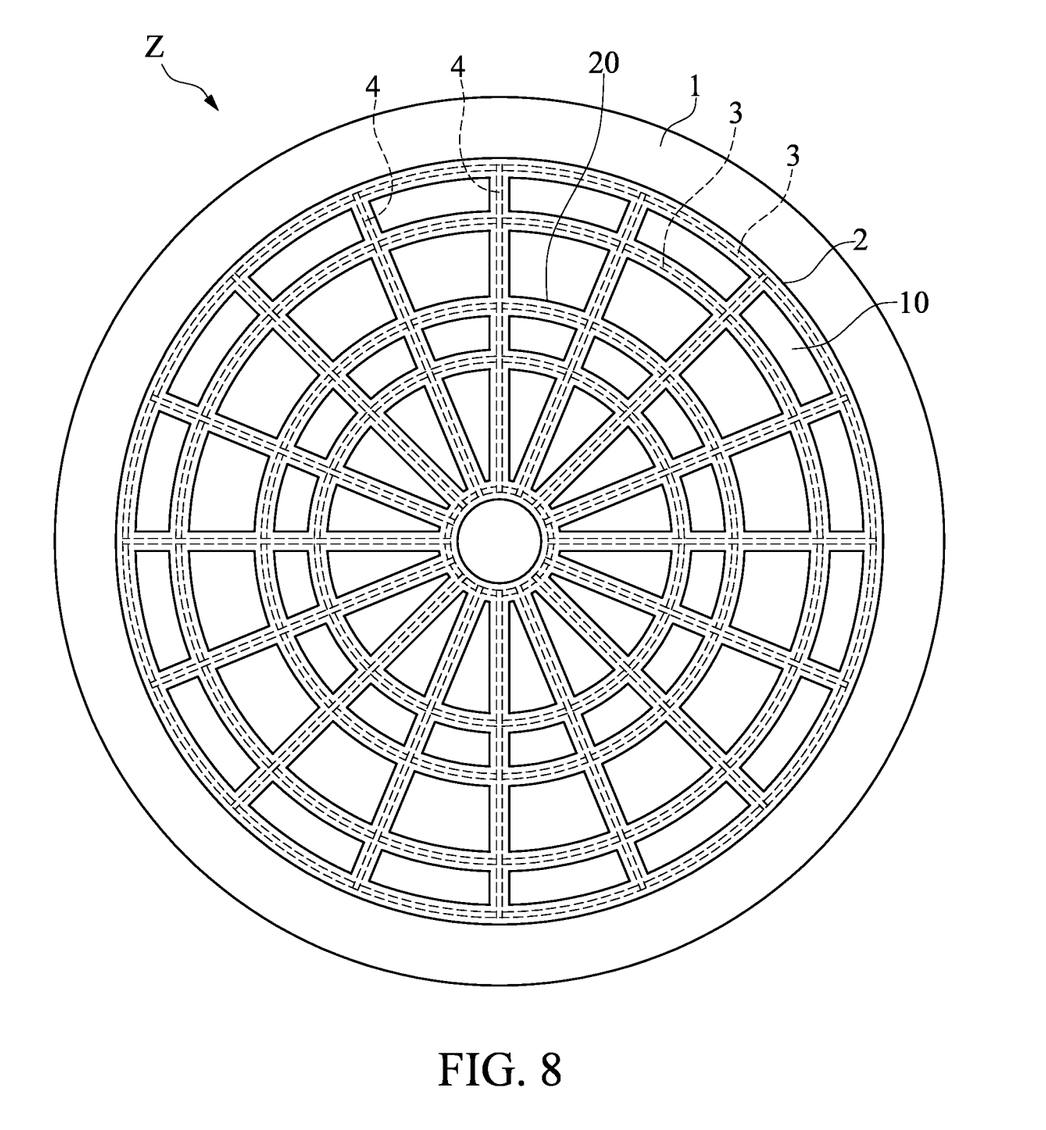
FIG. 8 is a schematic structural view of the dartboard structure according to the first embodiment of the present disclosure.

Accordingly, the present disclosure further provides a dartboard structure Z that includes a dartboard body unit 1, a dartboard frame unit 2, a first sensor unit 3, and a second sensor unit 4. The dartboard body unit 1 has a plurality of score regions 10. The dartboard frame unit 2 is disposed on the dartboard body unit 1, the dartboard frame unit 2 has a solid structure, and the dartboard frame unit 2 has a plurality of through openings 20 that penetrate through the dartboard frame unit 2, each of the through openings 20 corresponding to one of the score regions 10. The first sensor unit 3 is disposed in the dartboard frame unit 2. The second sensor unit 4 is disposed in the dartboard frame unit 2, and the second sensor unit 4 and the first sensor unit 3 are in an intersecting arrangement and have the predetermined gap H therebetween. The first sensor unit 3 and the second sensor unit 4 surround a plurality of first sensing regions S1, and each of the first sensing regions S1 corresponds to one of the score regions 10 and one of the through openings 20.

The aforementioned examples describe only one of the embodiments of the present disclosure, and the present disclosure is not intended to be limited thereto.

[Second Embodiment]

Reference is made to FIGS. 9 to 12, which are respectively a first schematic structural view of a dartboard frame unit, a first schematic structural view of a first sensor unit and a second sensor unit, a second schematic structural view of the dartboard frame unit, and a second schematic structural view of the first sensor unit and the second sensor unit of a dartboard structure according to a second embodiment of the present disclosure, and are to be viewed in conjunction with FIGS. 1 to 8. As shown in the figures, components of the dartboard structure Z of the present embodiment have similar manners of operation with similar components of the dartboard structure Z of the first embodiment, and will not be reiterated herein. It is worth noting that, in this embodiment, the dartboard frame unit 2 can include a plurality of first frame members 21 and a plurality of second frame members 22, the plurality of first frame members 21 and the plurality of second frame members 22 are in an intersecting and interconnecting arrangement and form the plurality of through openings 20, and each of the second frame members 22 passes through a portion of the first frame members 21. The plurality of first frame members 21 are in a concentric circle arrangement and the plurality of second frame members 22 are in a radial arrangement.

Figure 9:
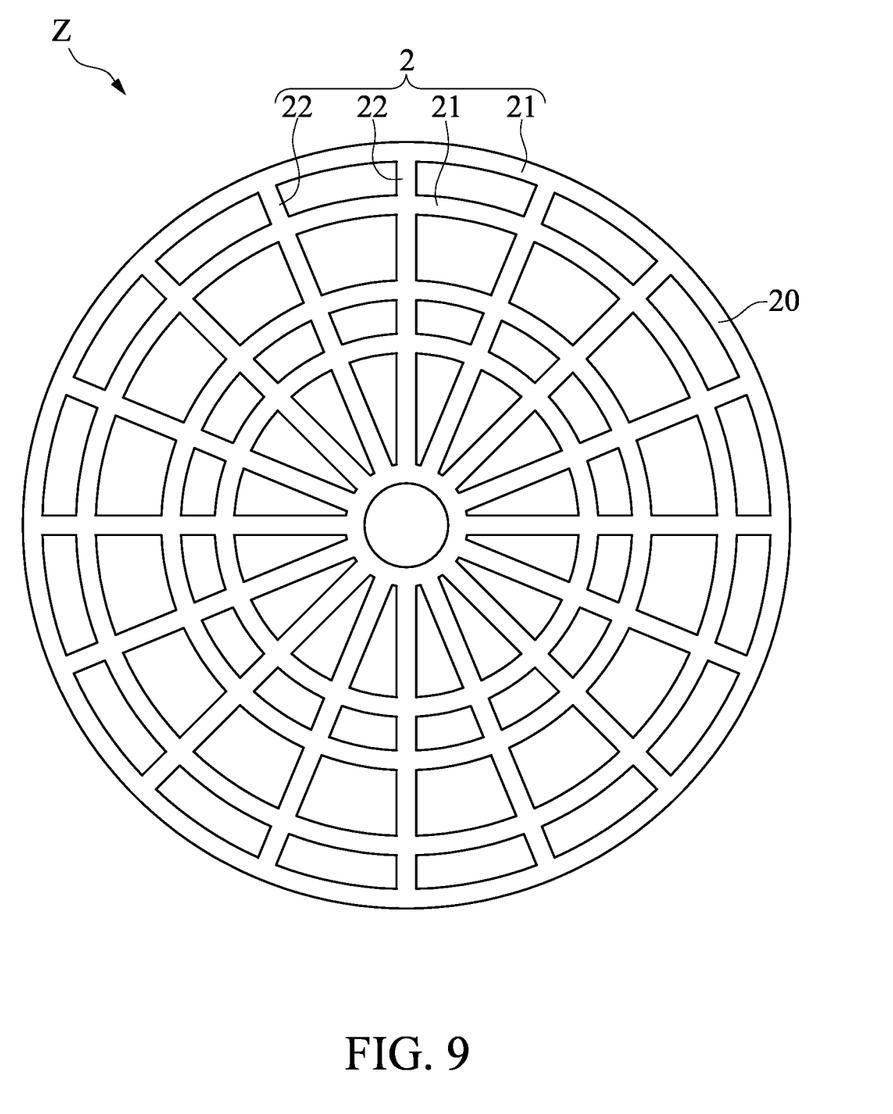
FIG. 9 is a first schematic structural view of a dartboard frame unit of a dartboard structure according to a second embodiment of the present disclosure.

For example, as shown in FIG. 9, the dartboard frame unit 2 of the present disclosure can include the plurality of first frame members 21 and the plurality of second frame members 22. The plurality of first frame members 21 can be arranged in a concentric circle arrangement, the plurality of second frame members 22 can be arranged in a radial arrangement, and the plurality of first frame members 21 and the plurality of second frame members 22 are in an intersecting arrangement. Each of the second frame members 22 passes through a portion of the first frame members 21 and is connected to a portion of the first frame members 21. Furthermore, two adjacent first frame members 21 and two adjacent second frame members 22 surroundingly form one of the through openings 20.

Further, in the step of disposing the first sensor unit 3 in the frame jig (step S102), the method for manufacturing the dartboard structure Z of the present disclosure further includes disposing each first wiring member 30 in the corresponding one of the first frame members 21, and each of the first wiring members 30 is ring-shaped. For example, as shown in FIGS. 1 to 5, 9 and 10, in the aforementioned step of filling the colloid C into the frame jig F and disposing the first sensor unit 3 and the second sensor unit 4 in the frame jig F to form the dartboard frame unit 2, the first sensor unit 3 can further include a plurality of first wiring members 30, each of the first wiring members 30 is disposed in the corresponding first frame member 21. Each of the first wiring members 30 can be ring-shaped and the first wiring members 30 are arranged in a concentric circle arrangement.

Further, in the step of disposing the second sensor unit 4 in the frame jig (step S102), the method for manufacturing the dartboard structure Z of the present disclosure further includes disposing each second wiring member 40 in the corresponding second frame member 22, and each of the second wiring members 40 and the plurality of first wiring members 30 have a predetermined gap H therebetween. Each of the second wiring members 40 is linear-shaped. For example, as shown in FIGS. 1 to 5, 9, and 10, in the aforementioned step of filling the colloid C into the frame jig F and disposing the first sensor unit 3 and the second sensor unit 4 in the frame jig F to form the dartboard frame unit 2, the second sensor unit 4 can further include the plurality of first wiring members 30. Each of the second wiring members

Figure 10:
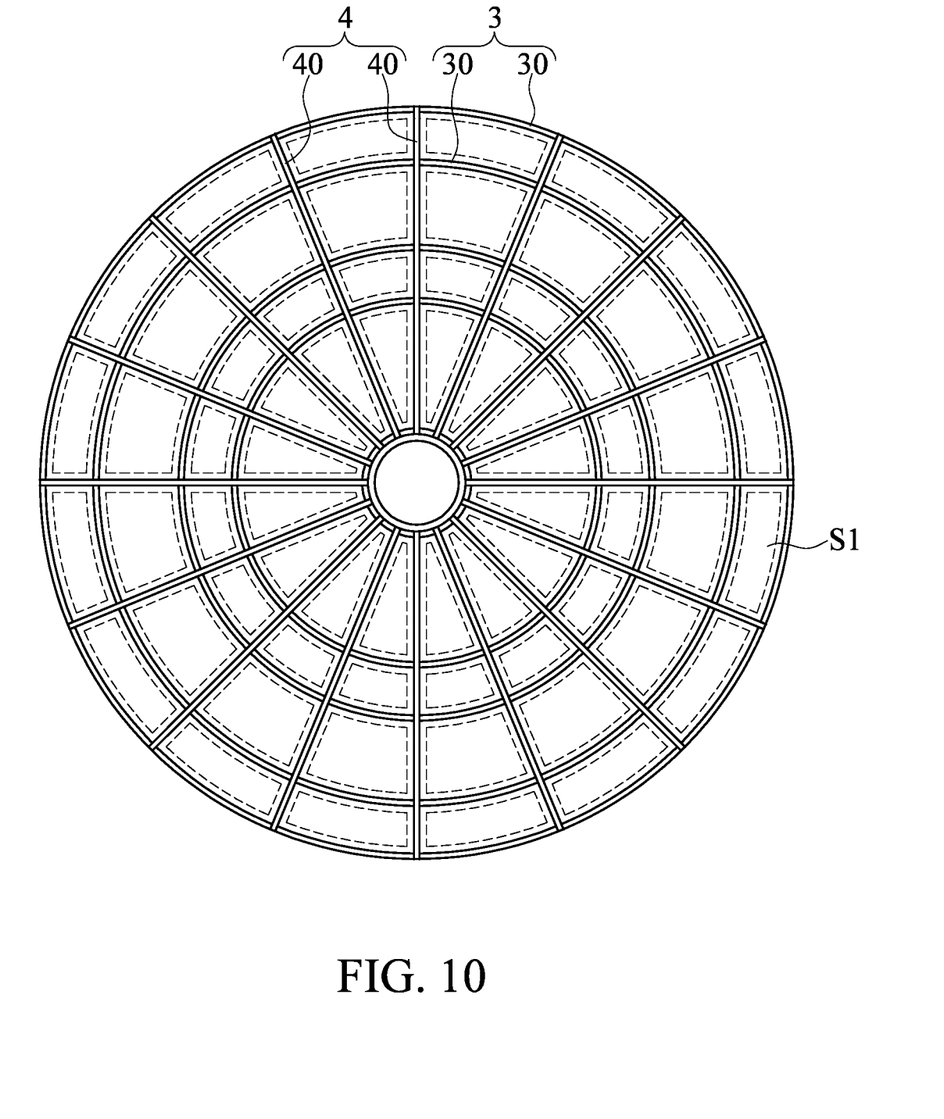
FIG. 10 is a first schematic structural view of a first sensor unit and a second sensor unit of the dartboard structure according to the second embodiment of the present disclosure.

40 is disposed in the corresponding second frame member 22, and can be linear-shaped and arranged in a radial arrangement.

In addition, each of the second wiring members 40 and the plurality of first wiring members 30 have the predetermined gap H therebetween, the predetermined gap H can be 0.1 to 3 mm, but it is not limited thereto. Furthermore, two adjacent first frame members 21 and two adjacent second wiring members 40 surroundingly form a first sensing region S1, and each of the first sensing regions S1 corresponds to one of the score regions 10 and one of the through openings 20.

Figure 11:
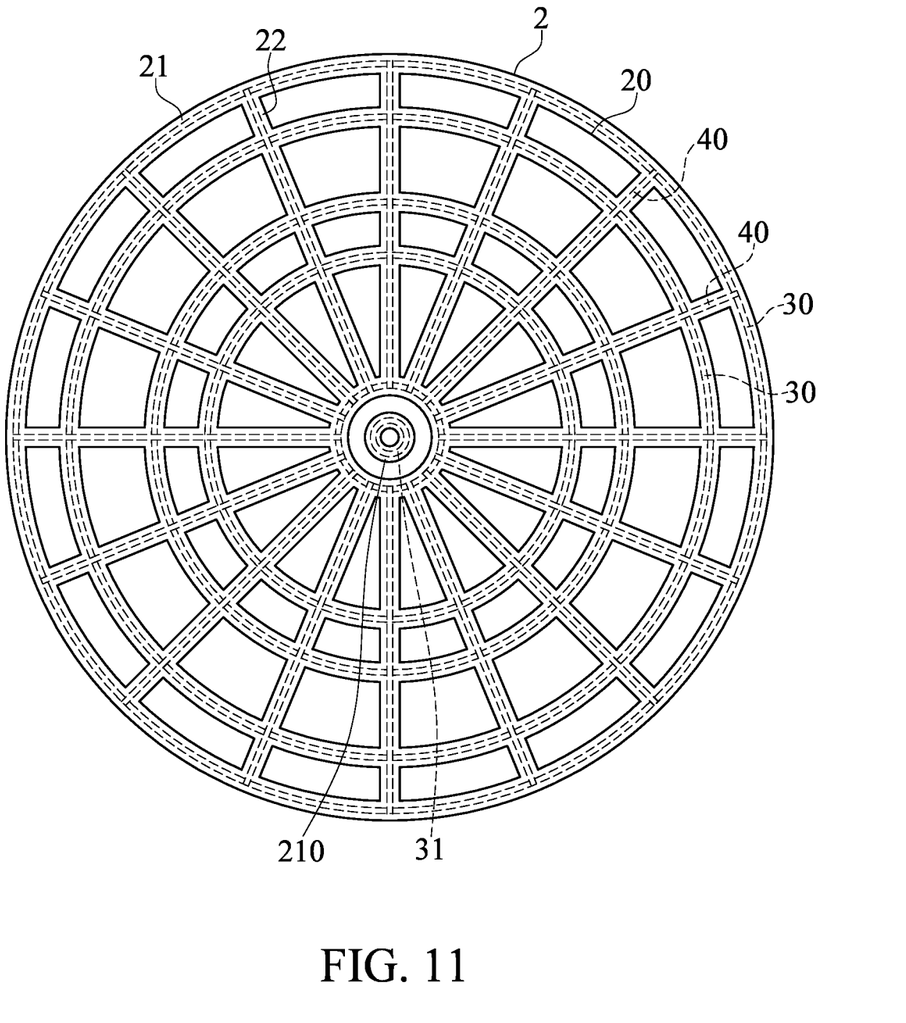
FIG. 11 is a second schematic structural view of the dartboard frame unit of the dartboard structure according to the second embodiment of the present disclosure.
Figure 12:
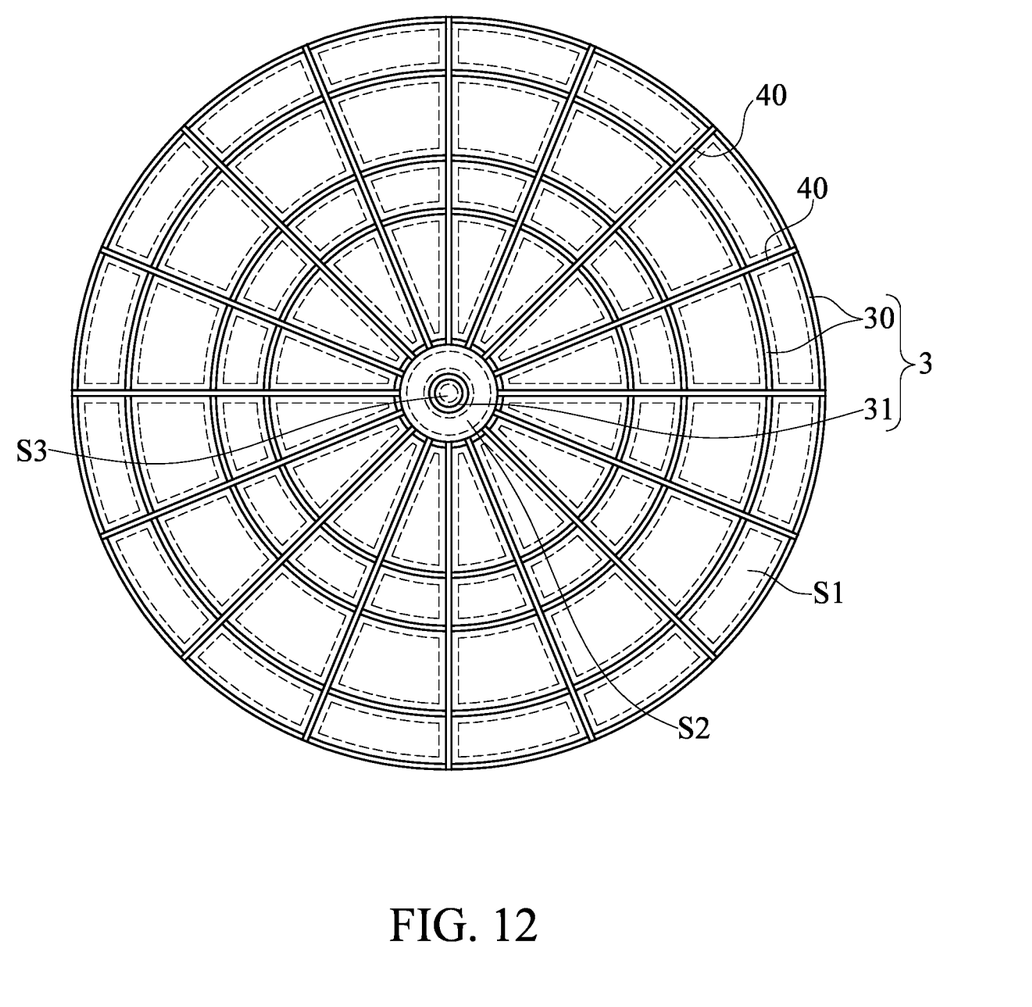
FIG. 12 is a second schematic structural view of the first sensor unit and the second sensor unit of the dartboard structure according to the second embodiment of the present disclosure.

Moreover, as shown in FIGS. 11 and 12, the first sensor unit 3 of the present disclosure further includes a first wiring member 31 that is not in contact with the second wiring member 40. A second sensing region S2 is formed between the first wiring member 31 and the adjacent first wiring member 30, and a third sensing region S3 can also be formed in a center of the first wiring member 31. The sensing methods of the first sensing region S1, the second sensing region S2, and the third sensing region S3 are different from each other, but it is not limited thereto. Accordingly, the dartboard frame unit 2 can also include a first frame member 210 that is not in contact with the second frame member 22, and the first wiring member 31 is disposed in the first frame member 210.

The aforementioned examples describe only one of the embodiments of the present disclosure, and the present disclosure is not intended to be limited thereto.

[Beneficial Effects of the Embodiments]

In conclusion, one of the beneficial effects of the present disclosure is that, by virtue of "the dartboard frame unit 2 being disposed on the dartboard body unit 1, the dartboard frame unit 2 having a solid structure, and the dartboard frame unit 2 having a plurality of through openings 20 that penetrate through the dartboard frame unit 2, and each of the through openings 20 corresponding to one of the score regions 10", "the first sensor unit 3 being disposed in the dartboard frame unit 2", "the second sensor unit 4 being disposed in the dartboard frame unit 2, and the second sensor unit 4 and the first sensor unit 3 being in an intersecting arrangement and having a predetermined gap H therebetween", and "the first sensor unit 3 and the second sensor unit 4 surrounding the plurality of first sensing regions S1, and each of the first sensing regions S1 corresponds to one of the score regions 10 and one of the through openings 20", the dartboard structure provided by the present disclosure is capable of improving the process efficiency during production and structural stability of the product.

Another beneficial effect of the present disclosure is that, by virtue of "providing a frame jig F", "disposing a first sensor unit 3 and a second sensor unit 4 in the frame jig F and filling a colloid C into the frame jig F to form a dartboard frame unit 2, so that the second sensor unit 4 and the first sensor unit 3 being in an intersecting arrangement and having a predetermined gap H therebetween", "removing the frame jig F", "disposing the dartboard frame unit 2 on a dartboard body unit 1 to form the dartboard structure Z" and "the first sensor unit 3 and the second sensor unit 4 surrounding a plurality of first sensing regions S1, and each of the first sensing regions S1 corresponding to one of the through openings 20", the method for manufacturing a dartboard structure is capable of improving the process efficiency of production and structural stability of the product.

Furthermore, through the aforementioned technical solutions, the dartboard structure Z and the method for manufacturing the dartboard structure Z provided in the present disclosure can not only solve the problems associated with the conventional sensor dartboard frame, such as having complicated processing procedures and difficulties in positioning of the sensor coils, but can also have the following advantages over the conventional manufacturing method.

(1) The positioning of the sensor coil is precise, especially at the corners, and the sensor coil is not prone to cause insufficient angles or broken wires resulting from an issue of the softness or hardness of a coil wire.

(2) The wire is sealed and protected, so that the wire is not prone to be broken or damaged by the tip of the dart, and the sensing effect is not easily affected by oxidation and deterioration caused by exposure.

(3) The sensor coils and the dartboard frame are integrally formed and can be made apart from the dartboard body, such that a highly automated production process can be more easily achieved and the efficiency during assembly is improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a dartboard structure, comprising:
    providing a frame jig;
    disposing a first sensor unit and a second sensor unit in the frame jig, and filling a colloid into the frame jig to form a dartboard frame unit; wherein the second sensor unit and the first sensor unit are in an intersecting arrangement and have a predetermined gap therebetween, and wherein the first sensor unit and the second sensor unit are not disposed on the same plane;
    removing the frame jig; and
    disposing the dartboard frame unit on a dartboard body unit to form the dartboard structure;
    wherein the dartboard frame unit has a plurality of through openings that penetrate through the dartboard frame unit, the first sensor unit and the second sensor unit surround a plurality of first sensing regions, and each of the first sensing regions corresponds to one of the through openings.

2. The method according to claim 1, wherein the dartboard frame unit includes a plurality of first frame members and a plurality of second frame members; wherein the plurality of first frame members and the plurality of second frame members are in an intersecting and interconnecting arrangement and form the plurality of through openings, and each of the second frame members passes through a portion of the first frame members; wherein the plurality of first frame members are in a concentric circle arrangement and the plurality of second frame members are in a radial arrangement.

3. The method according to claim 2, wherein the step of disposing the first sensor unit in the frame jig further includes disposing each of a plurality of first wiring members in a corresponding one of the first frame members; wherein each of the first wiring members is ring-shaped.

4. The method according to claim 3, wherein the step of disposing the second sensor unit in the frame jig further includes disposing each of a plurality of second wiring members in a corresponding one of the second frame members, and each of the second wiring members and the plurality of first wiring members have the predetermined gap therebetween; wherein each of the second wiring members is linear-shaped.

5. The method according to claim 4, wherein an adjacent two of the first frame members and an adjacent two of the second wiring members surroundingly form one of the first sensing regions.

* * * * *